United States Patent
Cho et al.

(10) Patent No.: US 7,448,146 B2
(45) Date of Patent: Nov. 11, 2008

(54) CYCLONE CONDENSING APPARATUS AND WASHING/DRYING MACHINE HAVING THE SAME

(75) Inventors: Hwang Mook Cho, Suwon-Si (KR); Hyung Gyoon Kim, Suwon-Si (KR); Sang Yeon Pyo, Suwon-Si (KR); Jae Ryong Park, Suwon-Si (KR); Byoung Yull Yang, Ansan-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 11/100,460

(22) Filed: Apr. 7, 2005

(65) Prior Publication Data
US 2006/0000111 A1 Jan. 5, 2006

(30) Foreign Application Priority Data
Jul. 2, 2004 (KR) .................. 10-2004-0051659

(51) Int. Cl.
F26B 11/02 (2006.01)
(52) U.S. Cl. ........................................ 34/601
(58) Field of Classification Search .............. 34/595, 34/601, 602; 68/19.2
See application file for complete search history.

(56) References Cited

U.S. PATENT DOCUMENTS

| | | | |
|---|---|---|---|
| 2,200,980 A | | 5/1940 | Boynton et al. |
| 2,959,044 A | * | 11/1960 | Stone .................. 68/12.15 |
| 3,319,347 A | | 5/1967 | Bentley |
| 4,118,207 A | * | 10/1978 | Wilhelm .................. 55/338 |
| 5,146,693 A | | 9/1992 | Dottor et al. |
| 6,016,610 A | * | 1/2000 | Sears .................. 34/82 |
| 2006/0123853 A1 | * | 6/2006 | Hong et al. .................. 68/19 |

FOREIGN PATENT DOCUMENTS

| | | |
|---|---|---|
| DE | 18 08 534 A1 | 6/1970 |
| EP | 0 585 519 A1 | 3/1994 |
| FR | 1 491 321 A | 11/1967 |
| GB | 280 268 A | 11/1927 |
| GB | 627 838 A | 8/1949 |
| JP | 04-067899 A | 3/1992 |
| JP | 08-332336 A | 12/1996 |
| JP | 2003-083679 A | 3/2003 |
| JP | 2003275497 * | 9/2003 |
| KR | 10-0442402 B1 | 7/2004 |

* cited by examiner

Primary Examiner—S. Gravini
(74) Attorney, Agent, or Firm—Sughrue Mion, PLLC

(57) ABSTRACT

A cyclone condensing apparatus having a structure in which air of high-temperature and high-humidity sufficiently contacts cooling water, and condensed water is efficiently discharged to the outside, and a washing/drying machine having the cyclone condensing apparatus. The cyclone condensing apparatus includes an air inlet connected to the upper part of a casing having a conical shape along a tangential direction; an air outlet disposed along the central line of the casing, and a plurality of cooling water spray nozzles disposed along the circumferential direction of the casing. A spiral groove for guiding condensed water downwards is formed in the inner circumferential surface of the casing, and a water-collecting container for collecting the condensed water is connected to the lower end of the casing. The cyclone condensing apparatus further includes an air blast fan and a heater in the washing/drying machine, and is connected to an air circulating duct forming a closed circuit together with a dry tub, thereby condensing water from air of high-temperature and high-humidity passed through the dry tub.

10 Claims, 4 Drawing Sheets

CYCLONE CONDENSING APPARATUS AND WASHING/DRYING MACHINE HAVING THE SAME

CROSS-REFERENCE TO RELATED APPLICATION

This application claims priority from Korean Patent Application No. 2004-51659, filed Jul. 2, 2004, in the Korean Intellectual Property Office, the disclosure of which is incorporated herein by reference.

BACKGROUND OF THE INVENTION

1. Field of the Invention

The present invention relates to a cyclone condensing apparatus and a washing/drying machine having the same and, more particularly, to a cyclone condensing apparatus, in which air of high-temperature and high-humidity in a casing flows in a cyclonic manner and effectively contacts cooling water, thereby improving condensing efficiency, and a washing/drying machine having the cyclone condensing apparatus.

2. Description of the Related Art

Generally, as a drum of a washing/drying machine is rotated alternately in the clockwise and counterclockwise directions, laundry is elevated upwards along the inner circumferential surface of the drum together with washing water and is then dropped, thereby being washed. After the washing of the laundry is completed, air in a high-temperature and low-humidity state is circulated in the drum, thereby drying the laundry.

Accordingly, the washing/drying machine comprises a tub for containing washing water, a drum rotatably installed in the tub for washing laundry, a door installed on the front surface of the tub so that the door is opened and closed to cause the laundry to be put into and taken out of the tub, and an air circulating duct installed outside the tub and connected to the drum for drying the washed laundry.

An air blast fan and a heater, for forcibly circulating air in a high temperature state through the drum, and cooling water spray nozzles, for condensing moisture from the air of a high temperature and high humidity state, passed through the drum and changing the air into a low humidity state, are installed in the air circulating duct.

After the washing of the laundry contained in the drum is completed by washing, rinsing, and dehydrating operations performed by the rotation of the drum, a drying operation for drying the laundry through the air circulating duct is performed. That is, when the air blast fan and the heater, which are installed in the air circulating duct, are operated, air is circulated in the air circulating duct and contacts the cooling water spray nozzles to be changed into a low-temperature and low-humidity state, and the air in the low-temperature and low-humidity state continuously passes through the heater to be changed into a high-temperature and low-humidity state, and passes through the laundry contained in the drum to be changed into a high-temperature and high-humidity state. The air of the high-temperature and high-humidity state again passes through the cooling water spray nozzles to be changed into the low-temperature and low-humidity state. Through the above series of an air circulating process, the laundry contained in the drum is dried.

Since the above-described conventional washing/drying machine has a structure such that the air, in the high-temperature and high-humidity state, flowing from the lower part of the air circulating duct to the upper part of the air circulating duct, contacts the cooling water spray nozzles installed on the upper part of the air circulating duct to be changed into the low-temperature and low-humidity state, there is an insufficient time taken to cause the air, in the high-temperature and high-humidity state, entered into the air circulating duct to contact water, in a low-temperature state, sprayed from the cooling water spray nozzles to be condensed into water. Accordingly, the conventional washing/drying machine is disadvantageous in that it has an excessively low condensing efficiency.

Particularly, when the flow rate of the air of high-temperature and high-humidity passing through the cooling spray nozzles of the air circulating duct is high, water sprayed from the cooling water spray nozzles is contained in the circulating air to flow into the drum rather than cool the circulating air to condense water from the air, thereby being supplied to the laundry and reducing drying efficiency.

Korean Patent Laid-open No. 2003-84070 discloses a drying machine, in which a cyclone, for generating moisture in a cyclonic manner, is installed in a cold air circulating duct.

The above-disclosed drying machine has the cyclone, which does not include cooling water spray nozzles for condensing moisture from air of high-temperature and high-humidity, but separates the moisture from the air by centrifugally circulating the air passed through the drum, thus having a comparatively low condensing efficiency, thereby being incapable of increasing drying efficiency and shortening the time taken to dry the laundry.

SUMMARY OF THE INVENTION

Therefore, an aspect of the invention is to provide a cyclone condensing apparatus, which allows air in a high-temperature and low-humidity state to sufficiently contact cooling water, and simultaneously discharges condensed water efficiently, and a washing/drying machine having the cyclone condensing apparatus.

In accordance with one aspect, the present invention provides a washing/drying machine comprising: a dry tub; an air circulating duct connected to the dry tub for forming a closed circuit together with the dry tub; an air blast fan for forcibly circulating air; a heater for heating the air; and a cyclone condensing apparatus, installed on the air circulating duct, including a casing, an air inlet and an air outlet connected to the air circulating duct, and a water condensing unit for condensing moisture contained in the air of the casing.

The air inlet may be connected to the upper part of the casing along a tangential direction; the air outlet may be disposed perpendicular to the central portion of the casing; and the water condensing unit may include at least one cooling water spray nozzle disposed on the upper surface of the casing.

The cyclone condensing apparatus may further include a spiral groove formed in the inner circumferential surface of the casing for guiding condensed water, generated from cooling water sprayed from the cooling water spray nozzle, to the lower part of the casing.

The casing may include a cylindrical portion having a constant diameter, and a conical portion having a diameter gradually decreasing downwardly from the cylindrical portion; and the air inlet may be connected to the cylindrical portion.

The lower end of the air outlet may be extended from the inside of the casing to the lower part of the cylindrical portion of the casing, and the upper end of the air outlet may pass through the upper surface of the casing and be connected to the air circulating duct.

The water condensing unit may further include a cooling water supply pipe, having a disk shape, disposed along the edge of the casing, and the cooling water spray nozzle may be extended from the cooling water supply pipe and disposed on the upper surface of the casing in the circumferential direction.

The cyclone condensing apparatus may further include a water-collecting container connected to the lower end of the casing for collecting condensed water flowing down along the spiral groove.

The cyclone condensing apparatus may further include: a discharge pipe connected to the lower end of the water-collecting container for discharging the condensed water collected in the water-collecting container; and a switch valve installed on the discharge pipe.

The cyclone condensing apparatus may further include a water level sensor installed at a designated height in the water-collecting container for automatically opening and closing the switch valve.

The washing/drying apparatus may further comprise a housing, wherein the dry tub is rotatably installed in the housing; and the water-collecting container is installed on the housing.

In accordance with another aspect, the present invention provides a cyclone condensing apparatus comprising: a casing; an air inlet connected to the upper part of the casing along a tangential direction; an air outlet disposed on the central portion of the casing; and at least one cooling water spray nozzle disposed on the upper surface of the casing.

BRIEF DESCRIPTION OF THE DRAWINGS

These and/or other aspects and advantages of the invention will become apparent and more readily appreciated from the following description of the exemplary embodiments, taken in conjunction with the accompanying drawings, in which.

Figure 1:
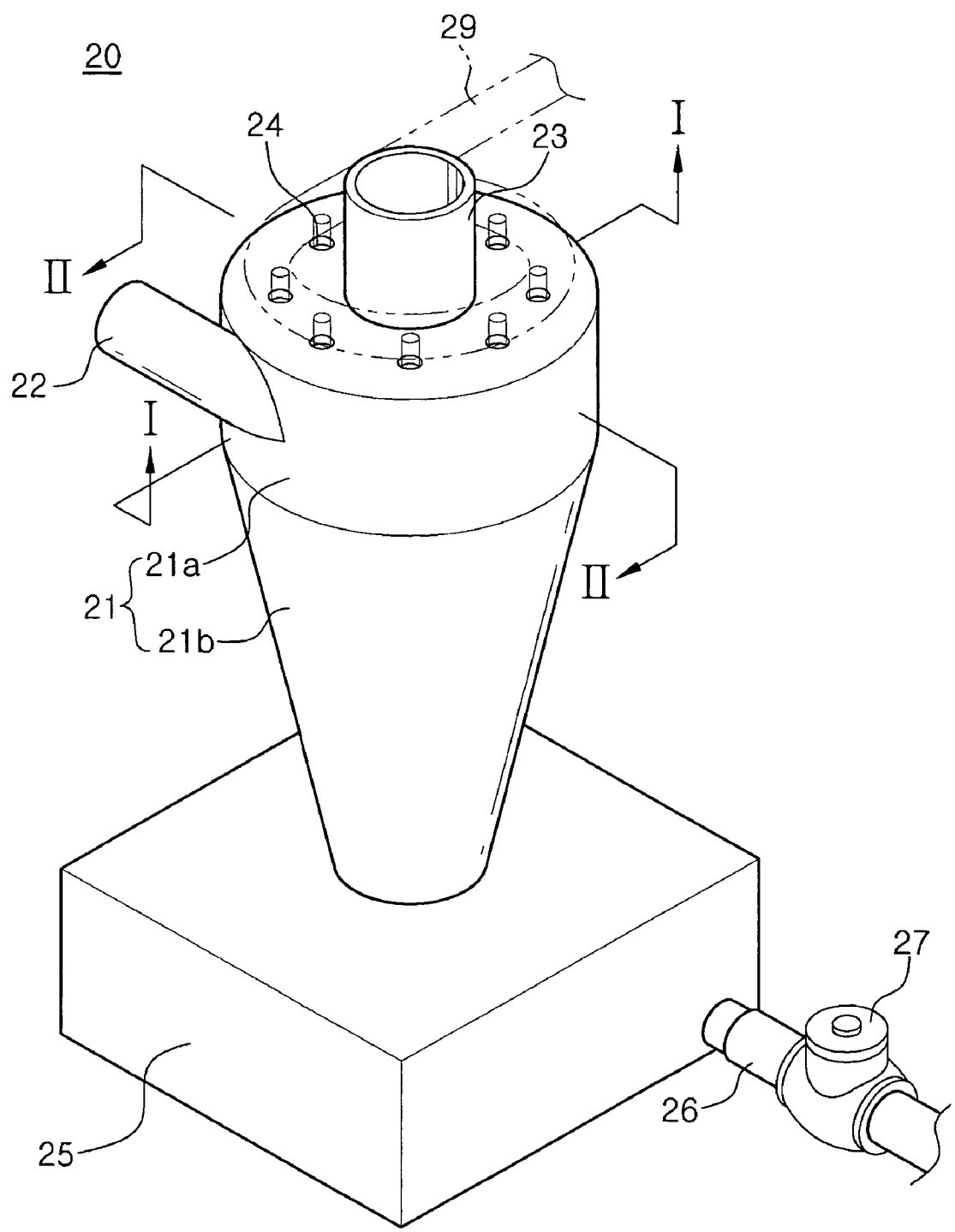
FIG. 1 is a schematic perspective view of a cyclone condensing apparatus consistent with the present invention.

DETAILED DESCRIPTION OF THE ILLUSTRATIVE, NON-LIMITING EMBODIMENTS OF THE INVENTION

Reference will now be made in detail to an illustrative, non-limiting embodiment of the present invention, an example of which is illustrated in the accompanying drawings, wherein like reference numerals refer to like elements throughout. The embodiment is described below to explain the present invention by referring to the accompanying drawings.

Figure 2:
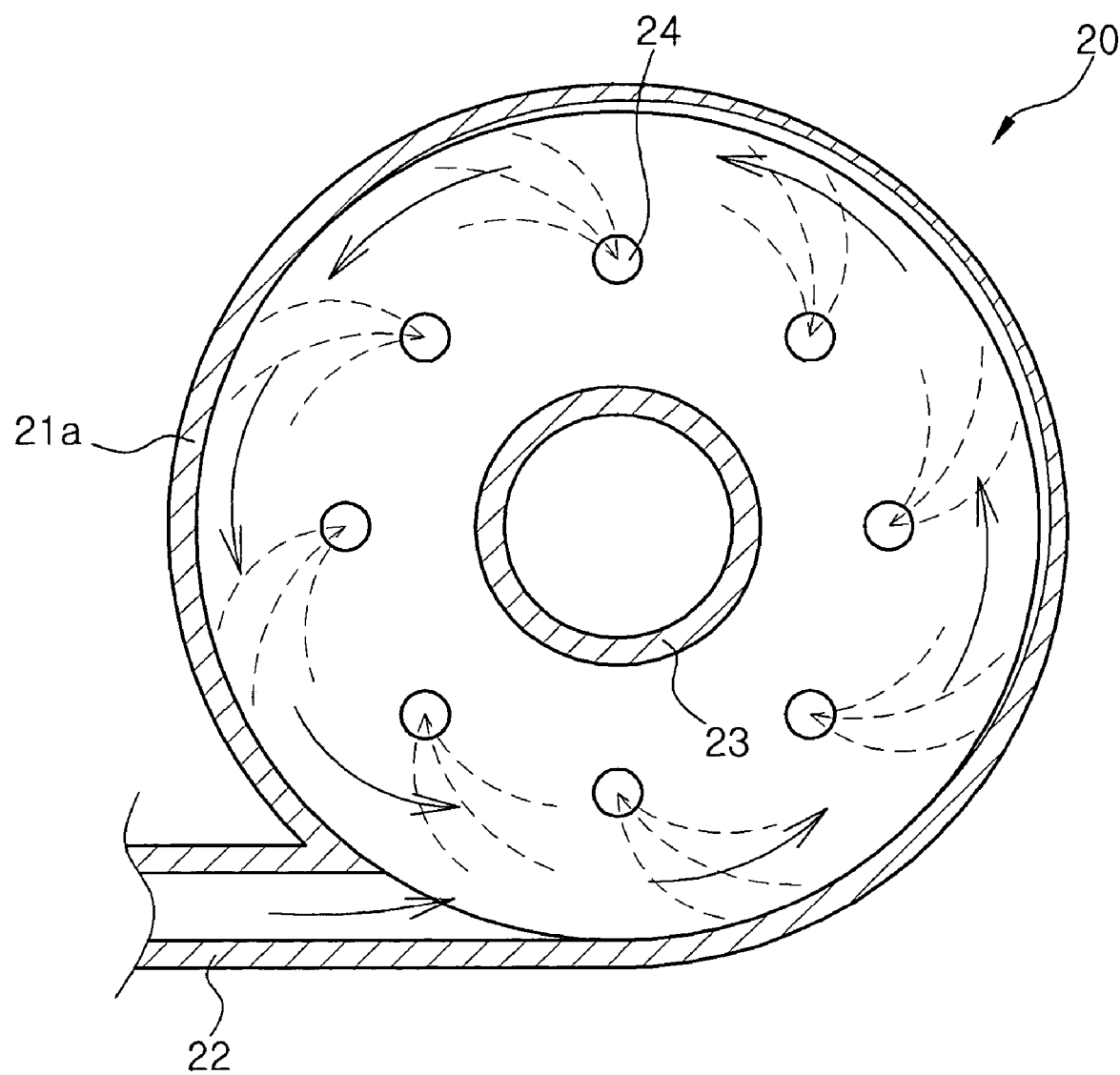
FIG. 2 is a cross-sectional view, taken along the line I-I of FIG. 1, illustrating the flow of cooling water and air along a transverse direction in the cyclone condensing apparatus consistent with the present invention.
Figure 3:
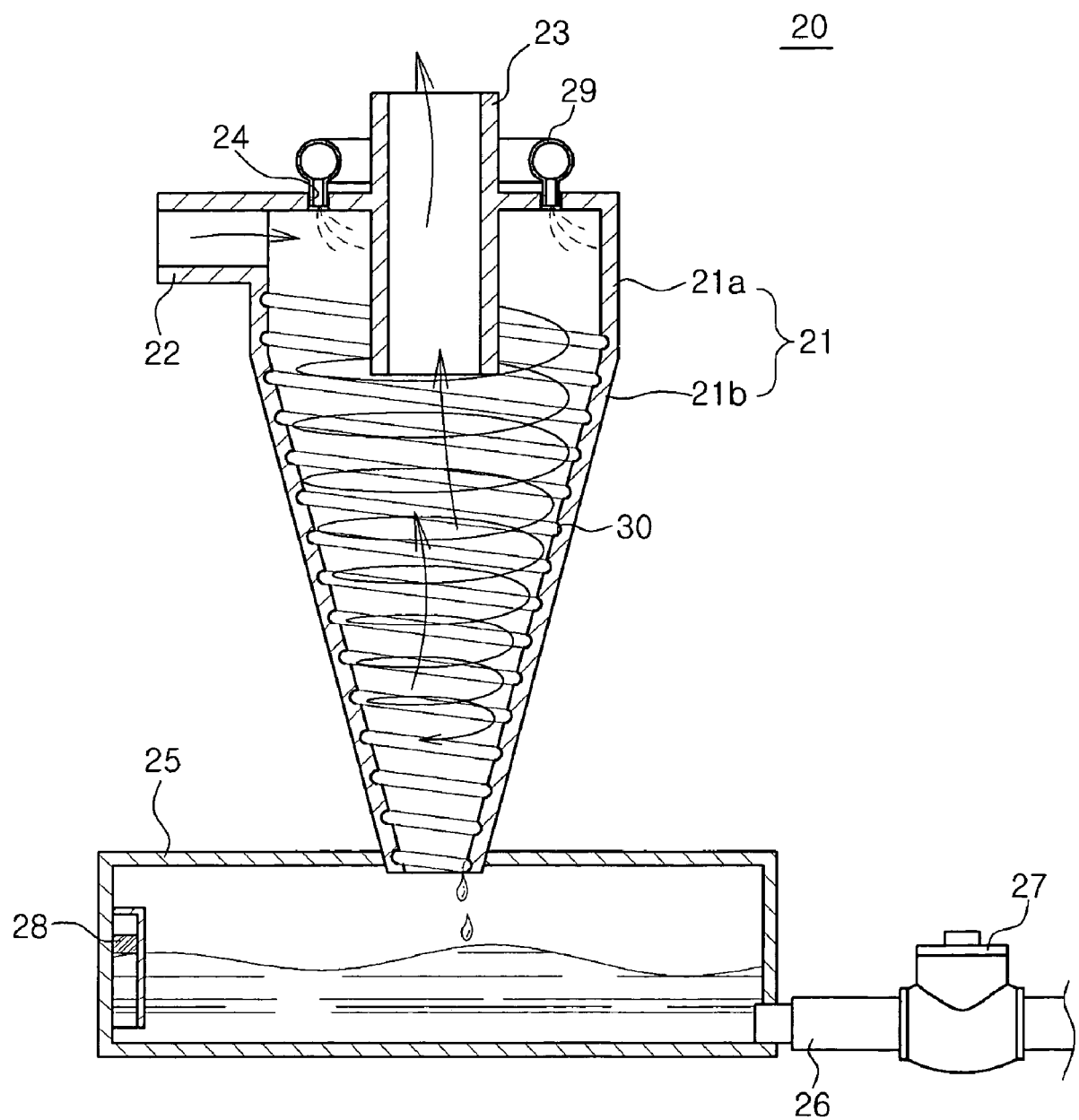
FIG. 3 is a longitudinal-sectional view, taken along the line II-II of FIG. 1, illustrating the flow of cooling water and air along a longitudinal direction in the cyclone condensing apparatus consistent with the present invention.

FIG. 1 is a schematic perspective view of a cyclone condensing apparatus consistent with the present invention. FIG. 2 is a cross-sectional view taken along the line I-I of FIG. 1, and FIG. 3 is a longitudinal-sectional view taken along the line II-II of FIG. 1.

As shown in FIG. 1, the cyclone condensing apparatus 20 consistent with the present invention comprises a casing 21 having an approximately conical shape, an air inlet 22 disposed on the upper part of the casing 21 along a tangential direction toward the inner circumferential surface of the casing 21, an air outlet 23 formed on the upper surface of the casing 21 along a central line, and a plurality of cooling water spray nozzles 24 arranged on the upper surface of the casing 21 in a circumferential direction.

The cyclone condensing apparatus 20 further comprises a water-collecting container 25 having an approximately hexahedral shape connected to the lower end of the casing 21 for collecting condensed water generated from the casing 21, a discharge pipe 26 connected to the lower end of the water-collecting container 25 for discharging the condensed water collected in the water-collecting container 25 to the outside, and a switch valve 27 installed in the discharge pipe 26 for opening and closing the discharge pipe 26.

The switch valve 27 is a solenoid valve, which can be electrically opened and closed. A water level sensor 28 (with reference to FIG. 3) for sensing the level of the condensed water is installed at a designated height in the water-collecting container 25, thereby allowing the switch valve 27 to be automatically opened and closed based on the level of the condensed water collected in the water-collecting container 25.

The casing 21 includes a cylindrical portion 21a having a constant diameter, and a conical portion 21b having a diameter gradually decreasing downwardly from the cylindrical portion 21a. The lower end of the conical portion 21b is connected to the upper part of the water-collecting container 25.

As shown in FIG. 3, a spiral groove 30, neighboring circular portions of which are separated from each other by a designated pitch, is formed in the inner circumferential surface of the casing 21, thereby rapidly guiding the condensed water, generated when cooling water sprayed from the cooling water spray nozzles 24 is mixed with air in a high-temperature and high-humidity state entered from the air inlet 22, to the lower part of the casing 21.

A cooling water supply pipe 29 having an approximately disk shape with a designated diameter is disposed on the upper surface of the casing 21, and each of the cooling water spray nozzles 24 is extended downwardly from the cooling water supply pipe 29 such that the cooling water spray nozzles 24 have diameters smaller than that of the cooling water supply pipe 29, and is connected to the upper surface of the casing 21. The cooling water supply pipe 29 and the cooling water spray nozzles 24 serve as a water-condensing unit for condensing and separating moisture contained in air in the high-temperature and high-humidity state.

The air outlet 23, which is disposed inside the cooling water spray nozzles 24 along the central line of the casing 21, is provided with a lower end extended to the lower part of the cylindrical portion 21a of the casing 21, and an upper end passing through the upper surface of the casing 21 and extended upwardly.

In the above-described cyclone condensing apparatus of the present invention as shown in FIG. 2, air in the high-temperature and high-humidity state enters into the air inlet 22 and flows along the inner circumferential surface of the casing 21. Simultaneously, when the cooling water spray nozzles 24 spray cooling water to the casing 21 through the cooling water supply pipe 29, the cooling water sprayed from the cooling water spray nozzles 24 is bent toward the inner circumferential surface of the casing 21 by the centrifugal force due to the flow of the air in the high-temperature and high-humidity state, and is mixed with the air in the high-temperature and high-humidity state.

Accordingly, as shown in FIG. 3, moisture contained in the air in the high-temperature and high-humidity state is cooled and condensed by the cooling water, and then the air in the high-temperature and high-humidity state is changed into a low-temperature and low-humidity state and discharged through the air outlet 23 to the outside. The condensed water flows down along the spiral groove 30 formed in the inner circumferential surface of the casing 21, and is stored in the water-collecting container 25.

When the condensed water stored in the water-collecting container 25 reaches a designated level, this level of the condensed water is sensed by the water level sensor 28, and the switch valve 27 installed in the drainage pipe 26 is automatically opened so as to discharge the condensed water to the outside. Then, when the condensed water stored in the water-collecting container 25 is lower than the designated level, this level of the condensed water is sensed again by the water level sensor 28, and the switch valve 27 is automatically closed so as to collect the condensed water in the water-collecting container 25.

The air in the high-temperature and high-humidity state is changed to the low-temperature and low-humidity state by the above process, thereby improving the condensing efficiency of the cyclone condensing apparatus.

Figure 4:
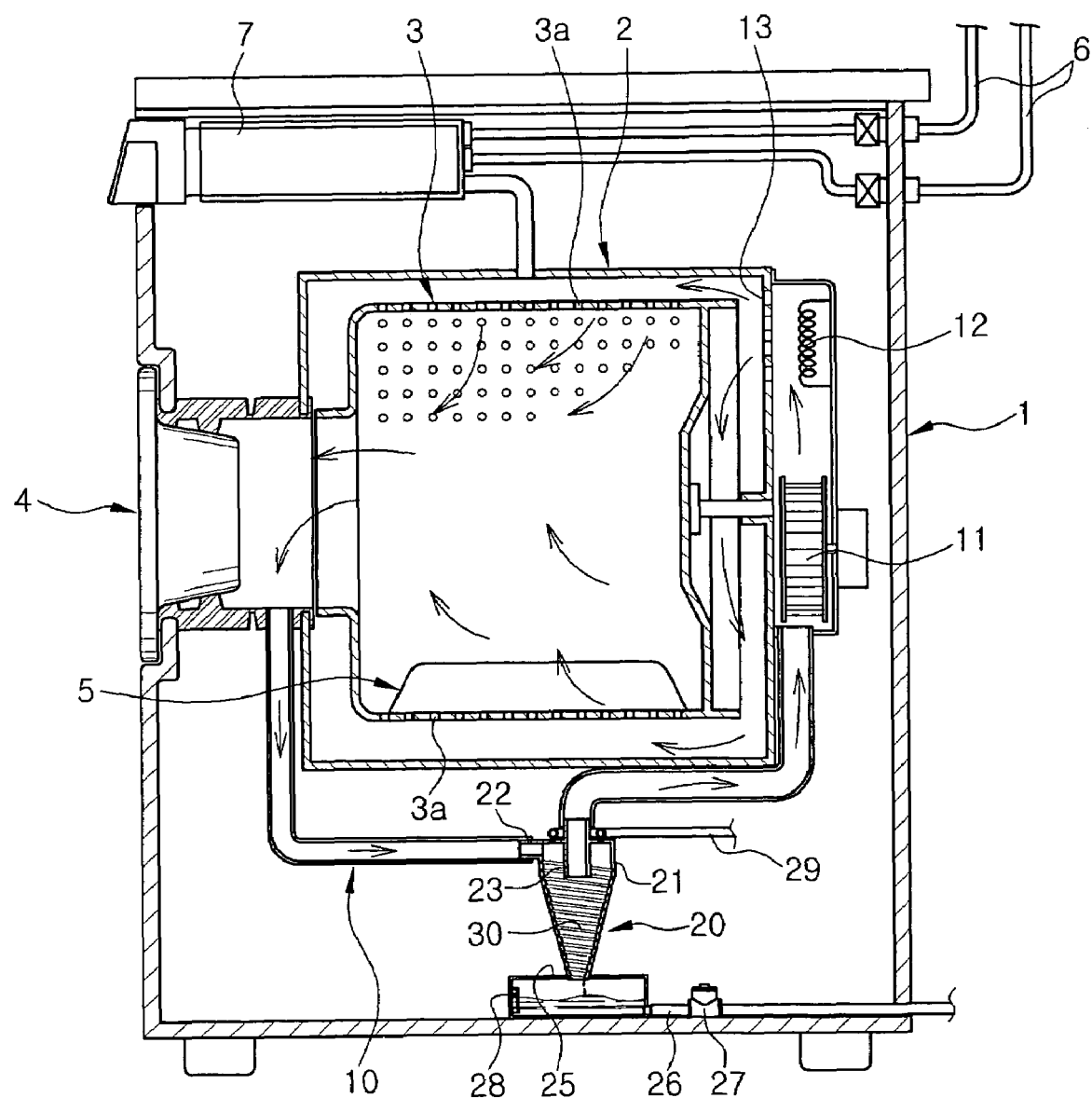
FIG. 4 is a longitudinal-sectional view of a washing/drying machine having the cyclone condensing apparatus consistent with the present invention.

FIG. 4 is a longitudinal-sectional view of a washing/drying machine having the cyclone condensing apparatus in accordance with the present invention.

As shown in FIG. 4, the washing/drying machine having the cyclone condensing apparatus of the present invention comprises a housing 1 having an approximately hexahedral shape for defining an external appearance, a tub 2, having a cylindrical shape, horizontally installed in the housing 1 for containing wash water, a drum 3 having a cylindrical shape, rotatably installed in the tub 2 and provided with a plurality of dehydration holes 3a formed therethrough, and a driving motor (not shown) rotating the drum 3 for performing washing, rinsing, and dehydrating operations.

The drum 2 serves as a washing drum in the washing operation, and serves as a drying drum in the drying operation.

The front surfaces of the tub 2 and the drum 3 are opened so that laundry can be put into and taken out of the drum 3 through the opened front surfaces of the tub 2 and the drum 3. A door 4 for opening closing the opened front surfaces of the tub 2 and the drum 3 is hinged to the front surface of the housing 1. Lifters 5, which are arranged on the inner circumferential surface of the drum 3 and separated at designated intervals along the longitudinal direction of the drum 3, elevate the laundry by the rotation of the drum 3 to a designated height, and then drop the laundry, thereby washing the laundry.

Water supply hoses 6, for supplying wash water from the outside to the tub 2, and a detergent container 7, for mixing detergent with the supplied wash water, are installed on the top of the housing 1, and a drainage pump (not shown), for discharging the washing water to the outside of the housing 1, is installed on the bottom of the housing 1.

An air circulating duct 10 for forming a closed circuit together with the drum 3 is installed outside the tub 2, thereby blowing air of a high-temperature and low-humidity state to the laundry contained in the drum 3 in the drying operation so that the washed laundry is rapidly dried.

An inlet of the air circulating duct 10 is placed at the opened front surface of the tub 2, and an outlet of the air circulating duct 10 is placed at the rear surface of the tub 2, through which through holes 13 are formed. An air blast fan 11 and a heater 12, for forcibly circulating the air of the high temperature through the air circulating duct 10, are installed adjacent to the outlet of the air circulating duct 10.

The cyclone condensing apparatus 20 is installed in the housing 1 such that the air inlet 22 and the air outlet 23 are connected to a middle portion of the air circulating duct 10 and the water-collecting container 25 is disposed on the bottom of the housing 1. The cooling water supply pipe 29 is connected to the water supply hoses 6 so that the cooling water is supplied to the cooing water supply pipe 29, and the drainage pipe 26 connected to the water-collecting container 25 is extended to the outside of the housing 1 so that the condensed water is discharged to the outside.

When the air blast fan 11 of the washing/drying machine having the cyclone condensing apparatus 20 of the present invention is operated in the drying operation, the air of the high-temperature and high-humidity state in the drum 3 flows through the air circulating duct 10, is changed into a low-temperature and low-humidity state by the cyclone condensing apparatus 20, and is then changed into a high-temperature and low-humidity state by the heater 12. The air in the high-temperature and low-humidity state flows into the drum 3 through the through holes 13 of the tub 2 and the dehydration holes 3a of the drum 3, thereby drying the laundry.

By the above-described process, the laundry contained in the drum 3 is rapidly dried, and the condensed water generated from the cyclone condensing apparatus 20 is discharged to the outside through the drainage pipe 26 due to the interaction between the switch valve 27 and the water level sensor 28.

As apparent from the above description, the present invention provides a cyclone condensing apparatus having a structure in which air of high-temperature and high-humidity sufficiently contacts cooling water and condensed water is efficiently discharged to the outside, and a washing/drying machine having the cyclone condensing apparatus, thereby rapidly condensing water from the air to shorten the time taken to dry laundry, and shortening an operating time of a heater to reduce power consumption.

Although exemplary embodiments of the invention have been shown and described, it will be appreciated by those skilled in the art that changes may be made in these embodiments without departing from the principles and spirit of the invention, the scope of which is defined in the claims and their equivalents.

What is claimed is:

1. A washing/drying machine comprising:
    a dry tub;
    an air circulating duct connected to the dry tub for forming a closed circuit together with the dry tub;
    an air blast fan for forcibly circulating air;
    a heater for heating the air; and
    a cyclone condensing apparatus, installed in the air circulating duct, including a casing, an air inlet and an air outlet connected to the air circulating duct, and a water condensing unit which condenses moisture contained in the air of the casing;
    wherein the water condensing unit is located at an upper surface of the casing for continuously introducing water into the casing during a drying operation,
    wherein an inlet of the air circulating duct is disposed at a front of the dry tub to receive air from the tub into the air circulating duct and an outlet of the air circulating duct is disposed at a rear of the dry tub to send air into the dry tub, wherein the air blast fan and the heater are disposed near the outlet so that heated air is forced into the dry tub from the outlet of the air circulating duct, and wherein the cyclone condensing apparatus is installed at a middle portion of the air circulating duct between the inlet and the outlet of the air circulating duct.

2. The washing/drying machine according to claim 1, wherein:
   the air inlet is connected to an upper part of the casing along a tangential direction;
   the air outlet is disposed perpendicular to a central portion of the casing; and
   the water condensing unit includes at least one cooling water spray nozzle disposed on an upper surface of the casing.

3. The washing/drying machine according to claim 2, wherein the cyclone condensing apparatus further includes a spiral groove formed in an inner circumferential surface of the casing for guiding condensed water, generated from cooling water sprayed from the at least one cooling water spray nozzle, to a lower part of the casing.

4. The washing/drying machine according to claim 1, wherein:
   the casing includes a cylindrical portion having a constant diameter, and a conical portion having a diameter gradually decreasing downwardly from the cylindrical portion; and
   the air inlet is connected to the cylindrical portion.

5. The washing/drying apparatus according to claim 4, wherein a lower end of the air outlet is extended from an inside of the casing to a lower part of the cylindrical portion of the casing, and an upper end of the air outlet passes through an upper surface of the casing and is connected to the air circulating duct.

6. The washing/drying apparatus according to claim 2, wherein the water condensing unit further includes a cooling water supply pipe, having a disk shape, disposed along an edge of the casing, and the at least one cooling water spray nozzle is extended from the cooling water supply pipe and disposed on the upper surface of the casing in a circumferential direction.

7. The washing/drying apparatus according to claim 3, wherein the cyclone condensing apparatus further includes a water-collecting container connected to a lower end of the casing for collecting condensed water flowing down along the spiral groove.

8. The washing/drying apparatus according to claim 7, wherein the cyclone condensing apparatus further includes:
   a discharge pipe connected to a lower end of the water-collecting container for discharging the condensed water collected in the water-collecting container to the outside; and
   a switch valve installed in the discharge pipe.

9. The washing/drying apparatus according to claim 8, wherein the cyclone condensing apparatus further includes a water level sensor installed at a designated height in the water-collecting container for automatically opening and closing the switch valve.

10. The washing/drying apparatus according to claim 7, further comprising a housing, wherein
   the dry tub is rotatably installed in the housing; and
   the water-collecting container is installed on the housing.

\* \* \* \* \*